United States Patent Office 3,320,969
Patented May 23, 1967

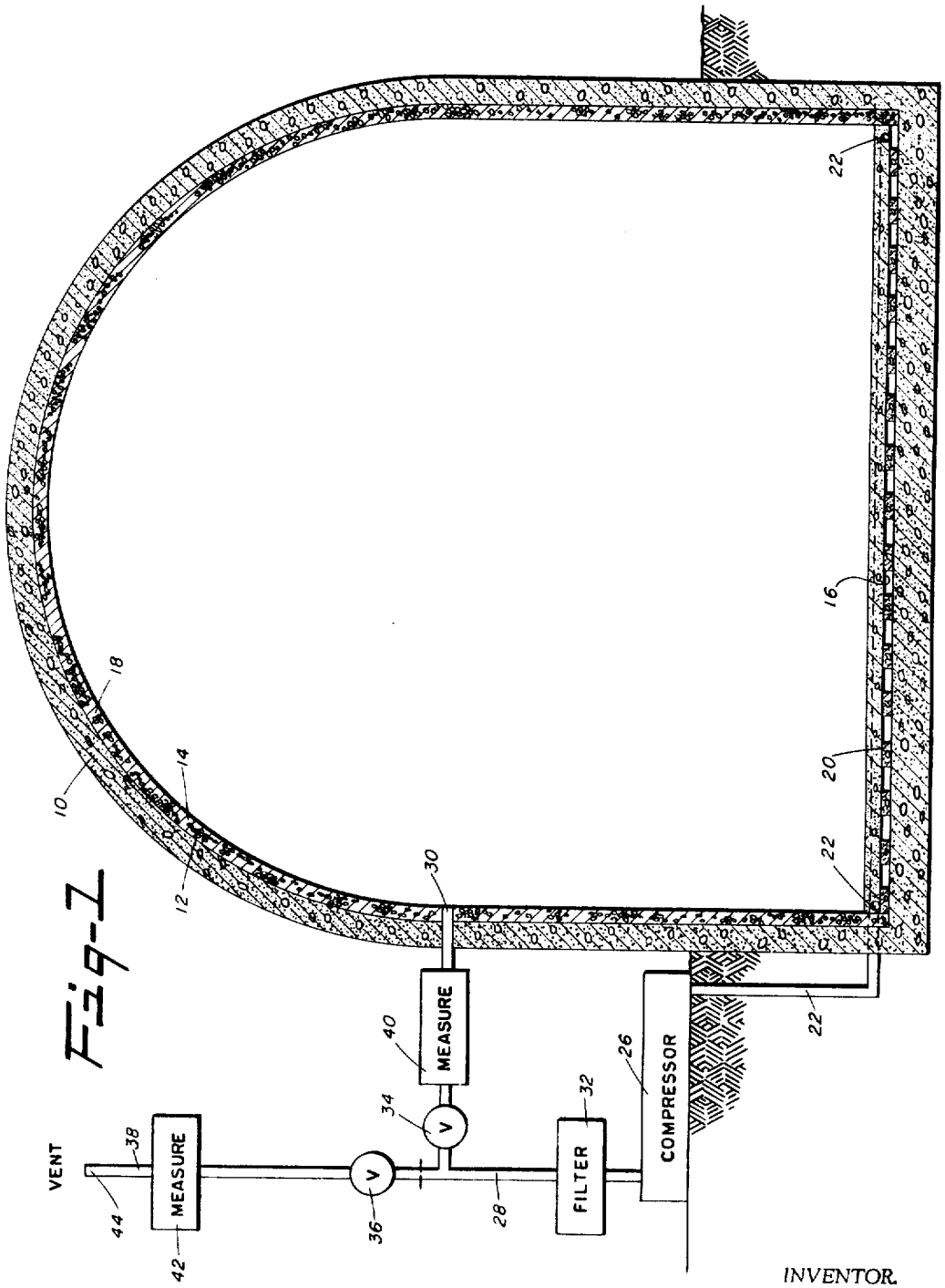

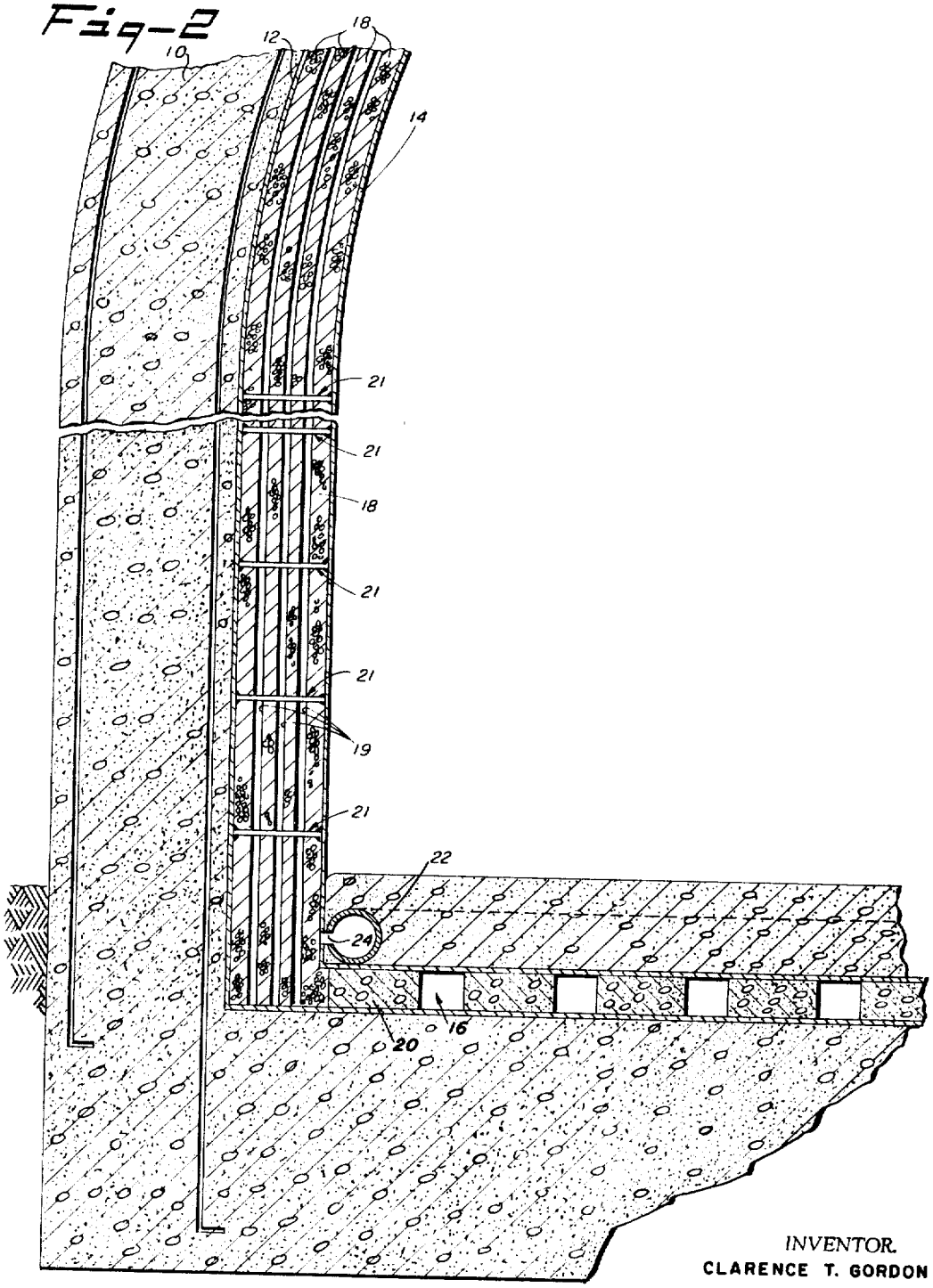

3,320,969
NUCLEAR CONTAINMENT VESSELS
Clarence T. Gordon, Lynn, Mass., assignor to Stone & Webster Engineering Corporation, Boston, Mass., a corporation of Massachusetts
Filed July 27, 1962, Ser. No. 212,864
7 Claims. (Cl. 137—312)

This invention relates to containment vessels and more particularly to improvements in containment vessels for nuclear power reactors, similar devices, or lethal environments from which leakage of toxic or radioactive gases, liquids, or vapors may be a problem.

The first large scale commercial use of nuclear reactor plants promises to be in the field of electrical power generation. Since nuclear reactor powered generating plants should be located in close proximity to heavily inhabited areas for economic reasons, it is essential for the general safety of the adjacent populace that such reactor plants be enclosed within suitable containment vessels. The containment vessel surrounds the nuclear reactor and primary system and prevents the leakage of radioactive gases or vapors from within the enclosure to the surrounding area both during normal operation, and more critically, in the event of certain types of nuclear incidents.

A single steel liner properly reinforced is generally considered to be adequate protection for containment vessels under normal operating conditions in sparsely settled locations. However, in areas of dense population, single shell containment vessels which are built with the best practical degree of commercial leaktightness, may permit a prohibitive amount of leakage. The failure of conventional containment vessels, such as those constructed from concrete with a steel liner, to provide sufficient leaktightness to prevent the escape of a prohibitive, even though small, amount of radioactive materials in populous areas has created a need for a new concept in containment vessels.

The invention of this application provides a containment vessel system that permits the construction and operation of nuclear reactors in heavily populated areas with a minimum of concern for the possibility of leakage of radioactive gases, liquids, and vapors to the surrounding atmosphere and that permits the containment vessel itself to be continuously monitored.

It is a primary object of this invention to provide a new and improved containment vessel that achieves both containment and control of all leakage from the containment vessel for nuclear reactors, similar devices, or lethal environments, and prevents leakage of toxic gases or vapors to the surrounding environment.

It is also an object of this invention to provide a new and improved containment vessel system for nuclear reactors and the like which yields a containment vessel and containment system that permits a nuclear reactor to be sited at any desired location, even in or near heavily populated areas, without fear of uncontrolled containment vessel leakage to the surrounding environment.

It is another object of this invention to provide a new and improved containment vessel for nuclear reactors and the like that includes means for continuously monitoring the integrity of the containment vessel to ensure that its integrity is not accidentally compromised.

Another object of this invention is to provide a new and improved containment vessel for nuclear reactors and the like, and to achieve a new concept in containment vessel construction that is particularly applicable to containment vessels of steel, or steel and concrete construction, which normally operate at a slight positive pressure, and that eliminates the problem of leakage from such positive pressure operation.

It is another object of this invention to provide a new and improved containment vessel for nuclear reactors and the like that includes two essentially leakproof sealing liners, the inner liner being within and spaced from the outer liner, and porous supporting means substantially filling the space between the liners but providing interconnected voids, whereby the porous supporting means reinforces and supports the inner liner and transfers pressures from the inner liner to the outer liner and thence from the outer liner to the outer shell of the containment vessel. The porous supporting means also protects the outer liner from missiles which may rupture the inner liner in the event of a nuclear incident. The containment vessel of this invention thus provides a double sealing shell with space creating porous reinforcement and support between the shells.

A further object of this invention is to provide a new and improved containment vessel for nuclear reactors and the like, which creates an enclosure that will retain liquid, gases, or vapor at elevated temperatures or pressures in the event of a nuclear incident without leakage to the surrounding environment.

A still further object of this invention is to provide a new and improved containment vessel for nuclear reactors and the like, which is completely effective in preventing any uncontrolled leakage whatsoever from the containment vessel, but which is relatively simple, easy, and inexpensive to construct.

Additional objects and advantages of the invention will be set forth in part in the description which follows, and in part will be obvious from the description, or may be learned by practice of the invention, the objects and advantages being realized and attained by means of the instrumentalities and combinations particularly pointed out in the appended claims.

In accordance with its purpose and objects this invention provides means for achieving an essentially leakproof containment vessel for nuclear reactors and the like, and is characterized by containment and control of all leakage from the interior compartment of the containment vessel. As embodied and broadly described, this means comprises an outer shell, a thin continuous liner within the outer shell, a second continuous inner liner spaced from and inside of the first liner to create an annular space between the two liners and surrounding the inner liner, and porous concrete means within and substantially completely filling the annular space to support and reinforce the inner liner and transfer pressures therefrom to the outer lining. The invention also includes an evacuating and compressing means, a conduit for collecting and conducting gases and vapors from the annular space to the evacuating and compressing means, and a second conduit for conducting the compressed gases and vapors back to the interior of the inner liner, so that any gas or vapor leakage from the interior of the inner liner to the annular space is returned to the interior of the inner liner.

The invention consists in the novel parts, constructions, arrangements, combinations, and improvements shown and described.

The accompanying drawings which are incorporated in and constitute a part of the specification illustrate one embodiment of the invention, and together with the description, serve to explain the principles of the invention.

Of the drawings:

FIG. 1 is a central vertical section of the containment vessel; and

FIG. 2 is a detailed sectional view of a portion of the containment vessel.

It is to be understood that both the foregoing general description and the following detailed description are exemplary and explanatory but are not restrictive of the invention.

Reference will now be made in detail to the present preferred embodiment of the invention, an example of which is illustrated in the accompanying drawings.

In accordance with the invention, a containment vessel is provided which is characterized by the containment and control of all leakage of gases and vapors from the interior of the containment vessel. As embodied, the means for achieving the containment vessel provides, as shown in FIGS. 1 and 2, an outer shell 10, preferably of reinforced concrete, a continuous outer liner 12, preferably of steel sheet, adjacent to the outer shell 10 and a continuous inner liner 14, preferably also of steel sheet. In the present preferred embodiment of the invention illustrated in the drawings, the two liners 12 and 14 comprise steel sheet which is full penetration welded to provide a complete, or essentially complete, liner for the containment vessel. The inner steel liner 14 provides the maximum degree of commercially available leaktightness under the design temperature and pressure conditions of the containment vessel.

The outer steel liner 12 surrounds the inner steel liner 14 in a manner that provides a substantial annular space between the two steel liners 12 and 14 and surrounding the entire periphery of the inner liner 14.

Both liners 12 and 14 are made as leaktight as possible so that air in-leakage through the concrete outer shell 10 into the annular space or compartment 16 is minimized as well as gas and vapor leakage from the interior of the containment vessel through the liner 14 into the annular space or compartment 16.

In accordance with the invention, means are provided to support the inner steel liner 14, to provide the annular space 16 comprising interconnected voids between liners, and to transfer all pressures from within the containment vessel to the outer reinforced concrete shell 10 with minimum deformation, and to protect the outer steel liner 12 from penetration by missiles from the interior of the containment vessel which might penetrate the inner liner 14 in the event of a nuclear incident.

As embodied, this means comprises a porous concrete 18, commonly referred to as "popcorn" concrete. "Popcorn" or no-fines concrete and its properties is described fully in the Journal of the American Concrete Institute, vol. 28, No. 4, October 1956, at pages 375–382, Journal of the American Concrete Institute, vol. 21, No. 6, February 1950, at pages 477–479, Journal of the American Concrete Institute, vol. 22, No. 10, June 1951, at pages 833–846. "Popcorn" or no-fines concrete, as set forth in these publications, is characterized as having an air content between about 20 and 40%, and also possesses high strength characteristics. The materials, mix, and method of placement of this porous concrete 18 are adjusted to provide a system of interconnected void spaces within the annular space 16, as well as to offer the desired compression strength and density when the concrete has set. Arteries 19 to ensure interconnected void spaces within the annular space or compartment 16 are provided as found necessary. A series of braces 21 (FIG. 2) interconnect the two liners 12 and 14 and in supporting and spacing the inner liner 14 from the outer liner 12 and particularly before the porous concrete 18 is poured. The horizontal or floor portions of the two liners 12 and 14 are separated by concrete blocks 20 or some other appropriate means capable of providing the desired air passages in the annular space 16 and of supporting the poured concrete floor of the containment vessel and all superimposed loads.

In accordance with the invention, means are provided for ensuring continuous evacuation of leakage gases and vapors from the annular space 16 and for returning these evacuated leakage gases and vapors to the interior of the containment vessel inside the inner liner 14. As embodied, this means comprises a conduit 22 which is connected to the annular space 16, as shown at 24 (FIG. 2). This conduit 22 leads to a compressor 26 (shown schematically by a block diagram) that serves to evacuate air, gas, or vapor from the annular space 16. A second conduit 28 is provided from the compressor to return the gas withdrawn from the annular space 16 to the interior of the containment vessel through a penetration of the inner liner at 30. Any air in-leakage from the reinforced concrete outer shell 10 through the outer liner 12 into the annular space 16 will also be collected by the compressor and transferred to the interior of the containment vessel by this same means.

The containment vessel system of this invention is designed so that a pressure slightly below atmospheric may be maintained in the annular space 16 by the compressor 26. In accordance with this invention, it may be desirable to include a filter 32 (FIG. 1) for removing a portion of the gases, vapors, and particulate material, prior to returning the air and the balance of the gases and vapors to the interior of the inner liner of the containment vessel. Also, under carefully controlled conditions, it may be desirable to discharge the evacuated and filtered gases to the atmosphere by means such as valves 34 and 36 and vent conduit 38. The filter 32 may be loaded with activated charcoal or a suitable molecular sieve. The vent conduit 38 includes a flow restriction or orifice 44 to limit the rate at which gases or vapors may be vented to the surrounding environment. Should there be a slight delay, for any reason, in closing valve 36, in the event of a nuclear incident, the orifice 44 will restrict the quantity of gas and vapor permitted to escape through the vent conduit 38.

Additional means for withdrawing air, gas, or vapor from within the annular space 16 may be provided at various locations around the circumference of the lower portions of the containment vessel, similar to the conduit 22.

Also, in accordance with the invention, measuring means may be included both in the return line or conduit 28 and in the vent conduit 38. The measuring means for the return line or conduit 28 is shown by a block diagram 40, and the measuring means for the vent conduit 38 is shown by a block diagram 42.

In accordance with the invention, during preoperational testing, or at any time thereafter during operations, the annular space 16 between the liners 12 and 14 of the containment vessel can be used as a temporary reservoir for leak detecting gases such as helium or Freon, so that all detectable leaks through the inner liner 14 can be located and repaired prior to initial or subsequent start-ups of the reactor.

After the containment vessel has been closed up, and sealed prior to normal power operation, the vessel may be pressurized with air to slightly above atmospheric pressure and maintained at that pressure under pressure control by any conventional, suitable, instrumentation system. In accordance with this invention, when the containment vessel is in operation, any air leaking from the vessel, together with any outside air leaking into the annular space 16, is continuously withdrawn through the conduit 22 from the containment vessel, compressed by the compressor 26, measured by the measuring means 40 and returned by the return line or conduit 30 to the containment vessel. By operating in this manner, the disclosed invention provides means for preventing the discharge of any detectable quantities of leakage gases or vapor directly into the atmosphere.

Also in accordance with this invention, excess air over and above that required to maintain the minimum containment vessel pressure, may be continually filtered through filter 32 and continually or periodically vented under automatic or manual pressure control through a suitable flow restriction, such as shown at 44 in vent conduit 38, measured by measuring means 42 and then released to the atmosphere. Over a period of time, the difference between the two integrated air flow measurements made by measuring means 40 and measuring means 42 is a continuous measure of the integrity of the inner liner 14 of the containment vessel.

In accordance with this invention, if a reactor accident or nuclear incident should occur which releases quantities of radioactive gases and vapors inside the containment vessel, means may be provided for automatically closing the containment vessel vent conduit 38 with manual back-up to ensure vent closure. Such automatic closure means can be provided by suitable and conventional instrumentation and devices.

The remainder of the containment vessel system continues in operation after closure of the vent conduit 38 and returns any leakage through the inner liner 14 into the annular space 16 back to the interior of the containment vessel. This operation may continue for a relatively long period of time until the design pressure of the containment vessel is approached. At this point the compressor 26 will be stopped, or may be continued in conjunction with controlled manual venting of the containment vessel through the system described above. Dependent upon the containment vessel design factors, gaseous leakage can be recovered and stored within the containment vessel for a period of time ranging from several days to indefinitely.

This invention thus provides a new and novel result in containment vessels characterized by containment and control of all leakage from the interior of the containment vessel. The invention achieves this result by relatively simple, effective, and inexpensive means through creation of an annular space or reservoir which traps all leakage from the interior of the containment vessel, and through the system provided, returns it to the interior of the containment vessel so that no detectable quantities of leakage are discharged directly to the atmosphere.

The invention in its broader aspects is not limited to the specific mechanism shown and described, but also includes within the scope of the accompanying claims any departures made from such mechanisms which do not depart from the principles of the invention and which do not sacrifice its chief advantages.

What is claimed is:

1. Containment vessels for nuclear reactors for containment and control of all leakage from the interior of the containment vessel and physically attained by a containment vessel and containment system for nuclear reactors comprising an outer pressure-containing reinforced concrete shell, a continuous steel outer liner within and adjacent to the outer shell, a continuous steel inner liner within and inwardly spaced from the outer liner to create an annular space having sidewall, dome and floor portions between the two liners and to provide an interior compartment for the vessel, porous "popcorn" concrete positioned between said liners and substantially filling the sidewall and dome portions of the annular space and forming an annular wall between said liners, said "popcorn" concrete wall providing interconnected voids throughout the sidewall and dome portions of the annular space whereby the porous "popcorn" concrete reinforces and supports the inner liner and transfers pressures from the inner liner to the outer liner but permits diffusion of gases and vapors within the annular space; spaced apart floor-supporting means between said liners in the floor portion of said annular space providing inter-connecting passages communicating with said voids; means for evacuating and compressing gas from the annular space; a first conduit means for conducting gases and vapors from the annular space to the evacuating and compressing means; a second conduit means for conducting the compressed gases and vapors to the interior compartment, whereby any gas and vapor leakage from the interior compartment to the annular space is returned to the interior compartment.

2. The invention as defined in claim 1, in which the containment vessel and containment system also include measuring means for measuring the compressed gases and vapors before their return to the interior compartment.

3. The invention as defined in claim 1, in which the containment vessel and containment system also includes a filter for filtering the compressed gas prior to its return to the interior compartment.

4. The invention as defined in claim 1, in which the containment system also includes a vent conduit and valve means, whereby a desired proportion of the compressed gases and vapor may be vented to the atmosphere.

5. The invention as defined in claim 4, in which the containment vessel and containment system also includes filter means for filtering the compressed gases and vapors.

6. The invention as defined in claim 4, in which the vent conduit and second conduit means each include measuring means for measuring the compressed gases and vapors flowing through the vent conduit and the second conduit means, respectively.

7. The invention as defined in claim 1, in which the floor supporting means in the floor portion of said annular space comprises a multiplicity of spaced blocks resting on the floor portion of the outer liner and supporting the inner liner.

References Cited by the Examiner

UNITED STATES PATENTS

| | | | |
|---|---|---|---|
| 1,381,175 | 6/1921 | Ericsson | 220—63 |
| 2,293,263 | 8/1942 | Kornemann | 137—264 X |
| 2,333,315 | 11/1943 | Klingberg | 50—160 X |
| 3,110,157 | 11/1963 | Radd | 220—14 X |

OTHER REFERENCES

Nuclear Merchant Ship Reactor Final Safeguards Report Environmental Analysis of NS "Savannah" Operation at Camden, USAEC Report ORNL–2867 (Rev.) Oak Ridge Natl. Lab. Oak Ridge National Laboratory Jan. 24, 1961, pages 9–11.

Fontana, M. H., Containment by Conventional Building Structures. In Nuclear Safety (1) (4), pages 53–56.

Washa, G. W., Properties of Lightweight Aggregates and Lightweight Concretes. In American Concrete Institute Proceedings, vol. 53, October 1956, pages 375–382.

WILLIAM F. O'DEA, *Primary Examiner.*

E. PAUL, ISADOR WEIL, R. GERARD, *Examiners.*